US006721783B1

(12) United States Patent
Blossman et al.

(10) Patent No.: US 6,721,783 B1
(45) Date of Patent: Apr. 13, 2004

(54) E-MAILER CONTROLLER FOR PRIVATELY AND SECURELY DELIVERING BANK NOTICES, ADVICES AND MONTHLY STATEMENTS

(75) Inventors: Gary B. Blossman, Covington, LA (US); Jeffrey P. Van Houten, Mandeville, LA (US)

(73) Assignee: Parish National Bank, Covington, LA (US)

( * ) Notice: Subject to any disclaimer, the term of this patent is extended or adjusted under 35 U.S.C. 154(b) by 0 days.

(21) Appl. No.: 09/449,373

(22) Filed: Nov. 24, 1999

(51) Int. Cl.[7] .............................................. G06F 13/00
(52) U.S. Cl. ..................... 709/206; 709/219; 709/328; 705/40; 705/70; 713/176
(58) Field of Search ................................ 709/217, 219, 709/206, 313, 328; 707/104; 705/64, 70, 34, 40; 713/168, 170, 175, 176

(56) References Cited

U.S. PATENT DOCUMENTS

| 5,093,787 A | 3/1992 | Simmons |
| 5,373,550 A | 12/1994 | Campbell et al. |
| 5,465,206 A | 11/1995 | Hilt et al. |
| 5,655,089 A | 8/1997 | Bucci |
| 5,677,955 A | 10/1997 | Doggett et al. |
| 5,699,528 A | 12/1997 | Hogan |
| 5,739,512 A | 4/1998 | Tognazzini |
| 5,895,455 A | * 4/1999 | Bellinger et al. .............. 705/35 |
| 6,557,039 B1 | * 4/2003 | Leong et al. ................ 709/229 |

OTHER PUBLICATIONS

RSA Laboratories' Frequently Asked Questions about Today's Cryptography, v 4.0, RSA Data Security, Inc., 1998.

* cited by examiner

Primary Examiner—Viet D. Vu
(74) Attorney, Agent, or Firm—Raymond G. Areaux; Lisa Velez

(57) ABSTRACT

An e-mailer controller which privately and securely delivers bank notices, advices and monthly statements via the Internet, other e-mail networks or the like. The e-mailer controller allows existing banking systems to deliver either printed bank statements or e-mailed bank statements. Thus, the banking system with the e-mailer controller is capable of multi-mode delivery of bank statements. The e-mailed mandated periodic statements include pictorial images of hardcopy banking instruments in accordance with customer preferences for presentation of such hardcopy banking instruments.

74 Claims, 12 Drawing Sheets

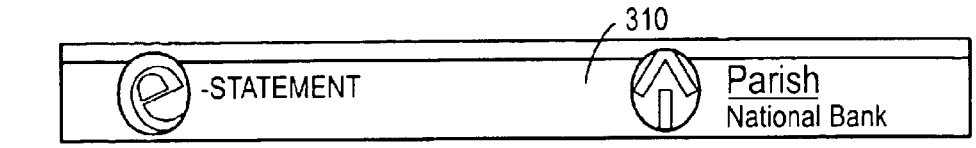

300

Date 5/03/99 Page 1
Account Number 0001000
Tax ID / SSN 999-99-9999
Customer Number 100
Enclosures 22

Gary or Donna Blossman

********* CHECKING ACCOUNTS *********

315a
50 Grand Plus Account 0001000 Number of Enclosures 22
Account Number 0001000 Statement Dates 4/06/99 thru 5/03/99
Previous Balance 871.68 Days in the statement period 28
13 Deposits/Credits 13,690.08 Average Ledger Balance 3,486.19
44 Checks/Debits 12,086.38 Average Collected Bal 3,451.68
Service Charge .00 Interest Earned 3.97
Interest Paid 3.97 Annual Percentage Yield Earned 1.51%
Current Balance 2,479.35 1999 Interest Paid 16.24

315b ******** DEPOSITS AND ELECTRONIC ADDITIONS ********

| DATE | DESCRIPTION | AMOUNT |
|---|---|---|
| 4/08 | ODP Advance<br>ACCOUNT NUMBER 0099999 | 70.75 |
| 4/14 | Telephone Transfer Credit | 555.00 |
| 4/14 | Telephone Transfer Credit | 555.00 |
| 4/14 | Telephone Transfer Credit | 600.00 |
| 4/14 | PAYROLL PPD PARISH NATIONAL | 2,723.22 |
| 4/14 | Deposit | 4,077.37 |
| 4/15 | Accounts Payable Payment<br>INVOICE(S) PAYMENT | 500.00 |
| 4/15 | Deposit | 81.72 |
| 4/16 | Deposit | 330.50 |
| 4/26 | Deposit | 750.00 |
| 4/29 | PAYROLL PPD PARISH NATIONAL | 957.44 |
| 4/30 | Deposit | 12.00 |
| 4/30 | Deposit | 2,477.08 |
| 5/03 | Interest Payment | 3.97 |

******** ELECTRONIC AND OTHER NON-CHECK WITHDRAWALS ********

| DATE | DESCRIPTION | AMOUNT |
|---|---|---|
| 4/06 | Francos PPD FRANCOS | 74.95 |
| 4/07 | Transfer to DDA<br>ACCOUNT NUMBER 0001111 | 600.00 |
| 4/15 | Transfer to DDA<br>ACCOUNT NUMBER 0001000 | 600.00 |
| 4/15 | Transfer to Christmas Club<br>ACCOUNT NUMBER 0005555 | 20.00 |

FIG. 5A

-STATEMENT           Parish
                     National Bank

```
                          Date  5/03/99        Page  2
                          Account Number      0001000
                          Tax ID / SSN     999-99-9999
                          Customer Number         100
                          Enclosures               22
```

Gary or Donna Blossman

50 Grand Plus Account      0001000      (Continued)

******** ELECTRONIC AND OTHER NON-CHECK WITHDRAWALS ********

| DATE | DESCRIPTION | AMOUNT |
|---|---|---|
| 4/16 | Transfer to DDA | 20.00 |
|      | ACCOUNT NUMBER 0002222 | |
| 4/16 | Telephone Transfer Debit | 70.93 |
| 4/16 | INSPAYMENTPPD ZURICH KEMPER | 26.36 |
| 4/16 | EQUITY ACCPPD AEGIS | 863.16 |
| 4/21 | Transfer to DDA | 600.00 |
|      | ACCOUNT NUMBER 0003333 | |
| 4/23 | ATM W/D 1159 04/23/99 5742 | 100.00 |
|      | 805 COLLINS         A | |
| 4/26 | MONTHLY PPD PAR SANITATION | 25.00 |
| 4/26 | TRM # 5812  ATM WITHDRAWAL | 55.71 |
|      | LITTLE TOYKO RE MANDEVILLE LA | |
| 4/27 | ATM W/D 0953 04/27/99 6335 | 100.00 |
|      | 805 COLLINS         NS LA | |
| 4/27 | TRM # 5411  ATM WITHDRAWAL | 8.57 |
|      | COLUMBIA ST. NA COVINGTON LA | |
| 4/27 | TRM # 5631  ATM WITHDRAWAL | 29.50 |
|      | DANCE N THINGS MANDEVILLE LA | |
| 5/03 | Transfer to DDA | 600.00 |
|      | ACCOUNT NUMBER 0001000 | |
| 5/03 | Transfer to Christmas Club | 20.00 |
|      | ACCOUNT NUMBER 0005555 | |
| 5/03 | ATM W/D 1138 05/02/99 0309 | 100.00 |
|      | 735 N CAUSEWAY | |
| 5/03 | MONTHLY PPD PAR SANITATION | 25.00 |
| 5/03 | TEL PYMT PPD BELLSOUTH | 43.71 |
| 5/03 | GAS BILL PPD ENTEX | 48.85 |
| 5/03 | EQUITY ACCPPD AEGIS | 1,000.00 |

320

******** CHECKS IN NUMBER ORDER ********

| DATE | CHECK NO | AMOUNT | DATE | CHECK NO | AMOUNT | DATE | CHECK NO | AMOUNT |
|---|---|---|---|---|---|---|---|---|
| 4/14 |        | 68.43  | 4/19 | 3646   | 361.55   | 4/21 | 3655*  | 86.02 |
| 4.29 |        | 77.00  | 4/21 | 3648*  | 51.24    | 4.20 | 3656   | 25.00 |
| 4/08 | 3640*  | 167.48 | 4/22 | 3649   | 31.36    | 4/22 | 3657   | 27.19 |
| 4/14 | 3642*  | 768.91 | 4/21 | 3650   | 1,526.30 | 4/19 | 3658   | 33.92 |
| 4/19 | 3643   | 555.00 | 4/21 | 3651   | 62.90    | 4/26 | 3660*  | 40.00 |
| 4/19 | 3644   | 555.00 | 4/23 | 3652   | 76.38    | 4/26 | 3664*  | 200.00 |
| 4/20 | 3645   | 65.96  | 4/28 | 3653   | 550.00   | 5/03 | 3667*  | 1,685.00 |

* Denotes skip in check numbers

FIG. 5B

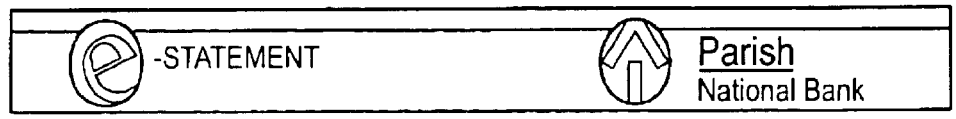

| Date | 5/03/99 | Page 3 |
|---|---|---|
| Account Number | | 0001000 |
| Tax ID / SSN | | 999-99-9999 |
| Customer Number | | 100 |
| Enclosures | | 22 |

Gary or Donna Blossman

50 Grand Plus Account    0001000    (Continued)

\*\*\*\*\*\*\*\*\*\* CHECKS IN NUMBER ORDER \*\*\*\*\*\*\*\*\*\*

| DATE | CHECK NO | AMOUNT |
|---|---|---|
| 4/27 | 3668 | 40.00 |

\* Denotes skip in check numbers

\*\*\*\*\*\*\*\*\*\* DAILY BALANCE INFORMATION \*\*\*\*\*\*\*\*\*\*

| DATE | BALANCE | DATE | BALANCE | DATE | BALANCE |
|---|---|---|---|---|---|
| 4/06 | 796.73 | 4/19 | 5,579.55 | 4/27 | 3,178.42 |
| 4/07 | 196.73 | 4/20 | 5,488.59 | 4/28 | 2,628.42 |
| 4/08 | 100.00 | 4/21 | 3,162.13 | 4/29 | 3,508.86 |
| 4/14 | 7,773.25 | 4/22 | 3,103.58 | 4/30 | 5,997.94 |
| 4/15 | 7,734.97 | 4/23 | 2,927.20 | 5/03 | 2,479.35 |
| 4/16 | 7,085.02 | 4/26 | 3,356.49 | | |

\*\*\*\*\*\*\*\*\*\* INTEREST RATE SUMMARY \*\*\*\*\*\*\*\*\*\*

| DATE | RATE |
|---|---|
| 4/05 | 1.5000% |

\*\*\* END OF STATEMENT \*\*\*

FIG. 5C

CHECK IMAGES
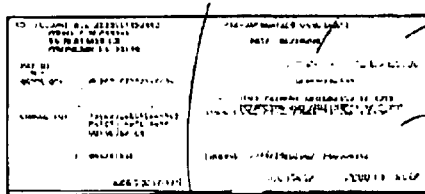
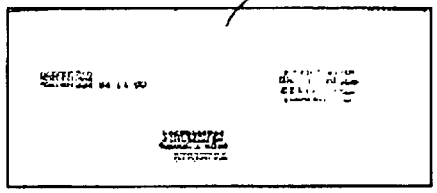
4/14/99　　0　　$68.43　　　　4/14/99　　0　　$68.43
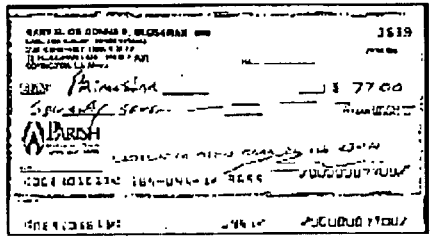
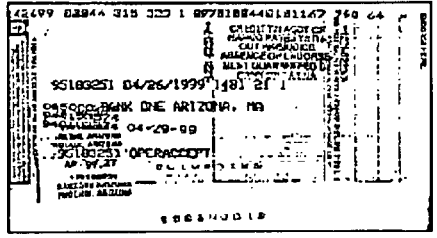
4/29/99　　0　　$77.00　　　　4/29/99　　0　　$77.00
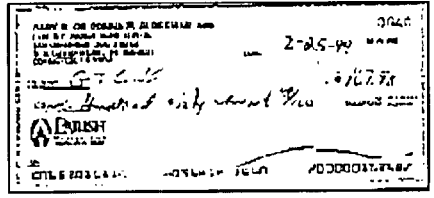
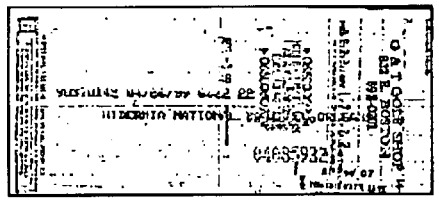
4/8/99　　3640　　$167.48　　4/8/99　　3640　　$167.48
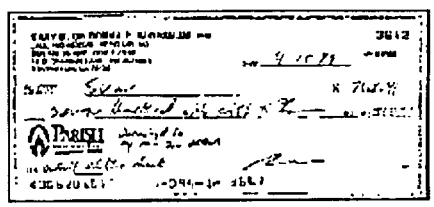
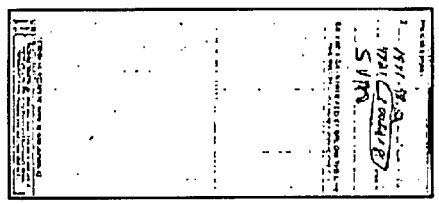
4/14/99　　3642　　$768.91　　4/14/99　　3642　　$768.91
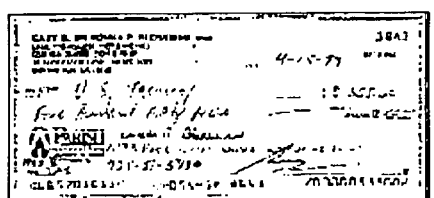
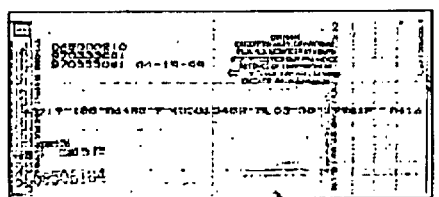
4/19/99　　3643　　$555.00　　4/19/99　　3643　　$555.00
FIG. 5D

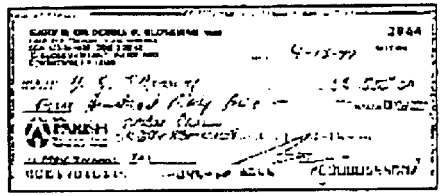
4/19/99 3644 $555.00
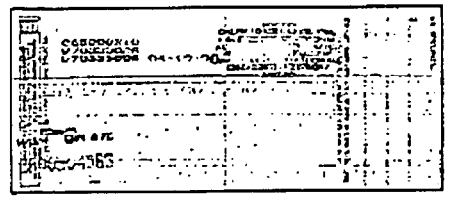
4/19/99 3644 $555.00
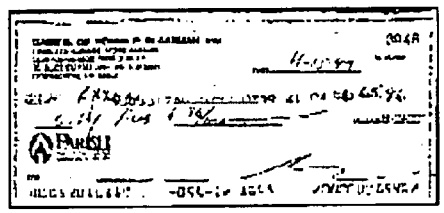
4/20/99 3645 $65.96
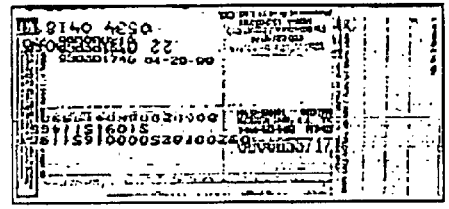
4/20/99 3645 $65.96
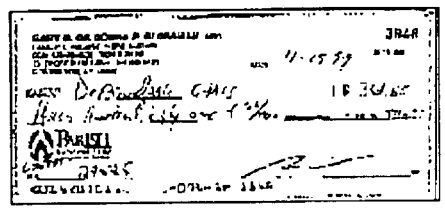
4/19/99 3646 $361.55
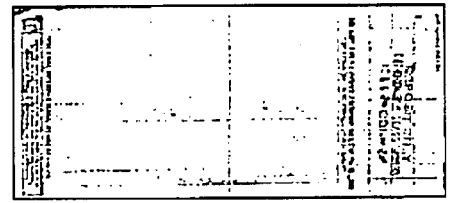
4/19/99 3646 $361.55
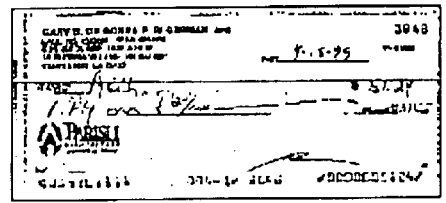
4/21/99 3648 $51.24
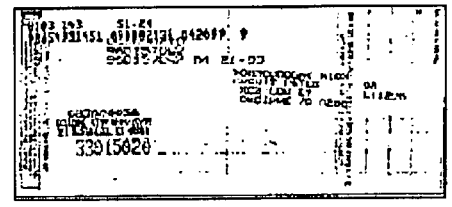
4/21/99 3648 $51.24
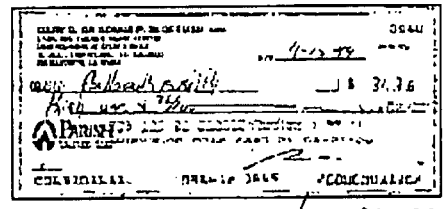
4/22/99 3649 $31.36
340  330a
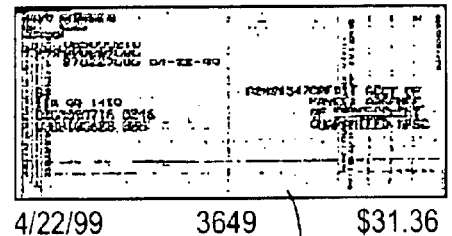
4/22/99 3649 $31.36
330b
FIG. 5E

| | |
|---|---|
| 4/21/99  3650  $1,526.30 | 4/21/99  3650  $1,526.30 |
| 4/21/99  3651  $62.90 | 4/21/99  3651  $62.90 |
| 4/23/99  3652  $76.38 | 4/23/99  3652  $76.38 |
| 4/28/99  3653  $550.00 | 4/28/99  3653  $550.00 |
| 4/21/99  3655  $86.02 | 4/21/99  3655  $86.02 |

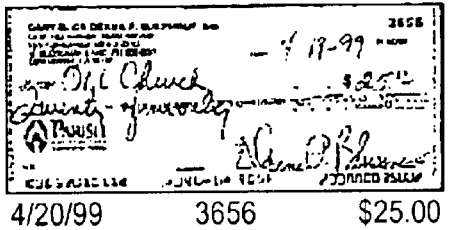
4/20/99　　　3656　　　$25.00
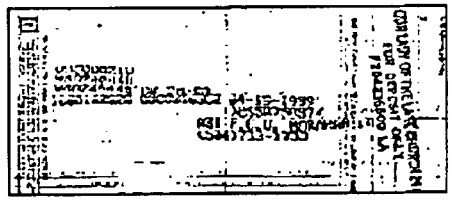
4/20/99　　　3656　　　$25.00
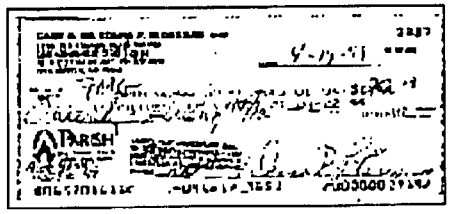
4/22/99　　　3657　　　$27.19
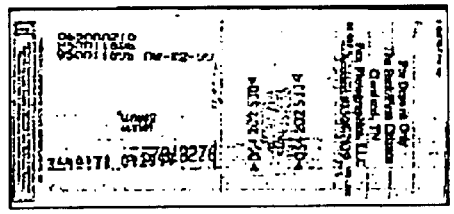
4/22/99　　　3657　　　$27.19
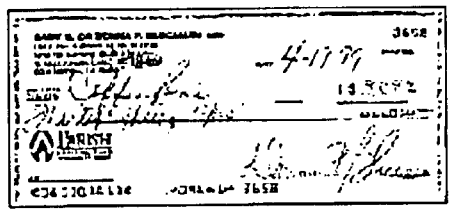
4/19/99　　　3658　　　$33.92
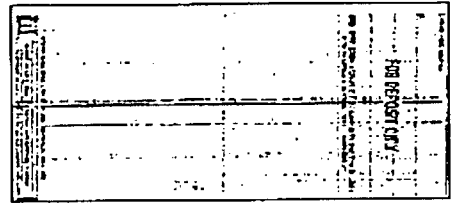
4/19/99　　　3658　　　$33.92
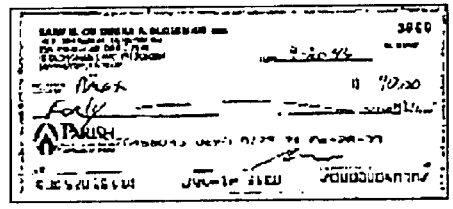
4/26/99　　　3660　　　$40.00
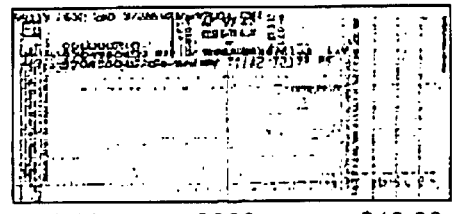
4/26/99　　　3660　　　$40.00
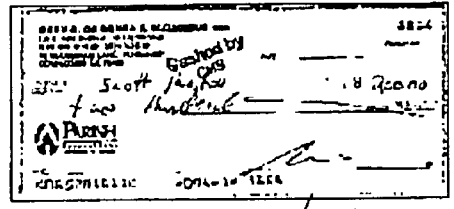
4/26/99　　　3664　　　$200.00
340　　330a
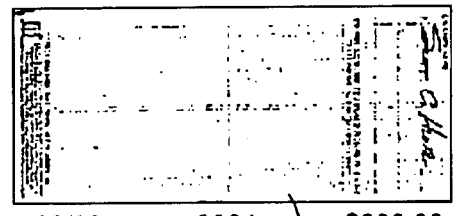
4/26/99　　　3664　　　$200.00
330b
FIG. 5G

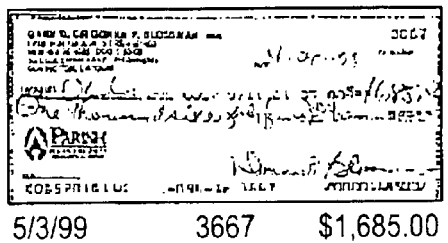
5/3/99 3667 $1,685.00
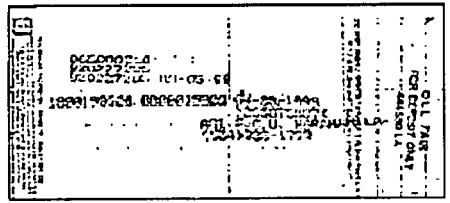
5/3/99 3667 $1,685.00
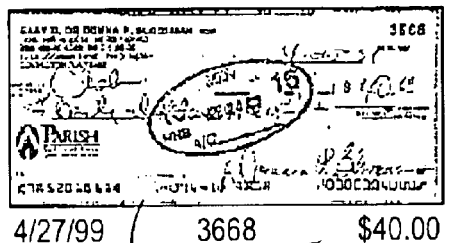
4/27/99 3668 $40.00
330a 340
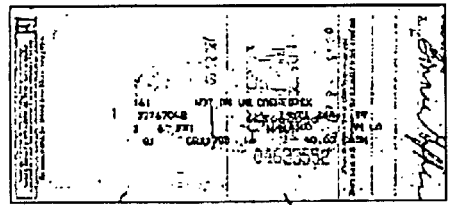
4/27/99 3668 $40.00
330b
FIG. 5H

| -STATEMENT |  Parish National Bank | | |
|---|---|---|---|
| CHECKS OUTSTANDING - NOT CHARGED TO ACCOUNT | You Can Easily BALANCE YOUR CHECK BOOK FOLLOW THESE EASY STEPS | | |
| Number or Date / $ | • Check off in your checkbook each of the checks paid by the bank and list the numbers and amounts of those not paid in the space provided at the left. Be sure to include any checks still outstanding from a previous statement.<br>• Enter and subtract from your checkbook balance any other charge appearing on the statement.<br>• Reconcile your statement in the space provided below. | | |
| | ENTER BANK BALANCE FROM STATEMENT | | |
| | ADD DEPOSITS NOT CREDITED BY BANK (IF ANY) | | |
| | TOTAL | | |
| | SUBTRACT TOTAL OF CHECKS OUTSTANDING | | |
| | THIS TOTAL SHOULD EQUAL YOUR CHECKBOOK BALANCE | | |

360

Please examine your statement promptly and report any errors immediately.
If no report is received within 10 days, the account will be considered correct.

ENTER BANK BALANCE FROM STATEMENT
ADD DEPOSITS NOT CREDITED BY BANK (IF ANY)
THIS TOTAL SHOULD EQUAL YOUR CHECKBOOK BALANCE

TOTAL         SUBTRACT TOTAL OF CHECKS OUTSTANDING

Please examine your statement promptly and report any errors immediately.
If no report is received within 10 days, the account will be considered correct.

FIG. 51

E-MAILER CONTROLLER FOR PRIVATELY AND SECURELY DELIVERING BANK NOTICES, ADVICES AND MONTHLY STATEMENTS

TECHNICAL FIELD

The present invention relates to e-mail systems and, more particularly, to a banking system having an e-mailer controller which privately and securely delivers bank notices, advices and mandated periodic statements via the Internet, a network or the like. Moreover, the present invention is related to a banking system having multi-mode delivery of bank notices, advices and mandated periodic statements.

BACKGROUND OF THE INVENTION

Presently, banks, credit unions or the like (hereinafter referred to as "banking institutions") deliver to each of their customer's a mandated periodic statement of transactions (hereinafter referred to as a "mandated periodic statement") affecting the customer's account and other bank notices and advices. However, the format of the mailed mandated periodic statement differs from one banking institution to another. For example, some banking institutions include the actual paper document of each cleared check itemized in the mandated periodic statement. Thus, after printing the mandated periodic statement, the envelop is stuffed with both the printed mandated periodic statement and the cleared checks. Nevertheless, other banking institutions do not provide the paper document of each clear check.

On the other hand, some banking institutions are equipped with a proof-of-deposit (POD) imaging system which scans at least the front view of cleared checks and stores the scanned image of such front view. Those banking institutions with a POD imaging system include, in their mailed mandated periodic statement, at least the front view of the scanned image of cleared checks. Hence, the mailed mandated periodic statement may be delivered to the customer either in a printed form or, alternately, an electronic form via a Compact Disk or the like. While such electronic form of the mailed mandated periodic statement has its advantages for long term storage and retrieval by the customer, the Compact Disk or the like is still mailed to the customer via the postal service. Thus, little cost savings have been incurred by the banking institutions to provide such alternative.

Several systems have been patented which are aimed at electronic statements.

For example, U.S. Pat. No. 5,677,955, issued to Doggett et al., entitled "ELECTRONIC FUNDS TRANSFER INSTRUMENTS," discloses that the payer's and payee's banks provide statements or reports to the payer and the payee, respectively, regarding their electronic check transactions. These statements may be generated electronically or on paper. Further, the payer's bank may include a copy of the electronic check with the payer's statement. It should be noted, that these checks are described in the Doggett et al. patent as similar to paper checks. However, the Doggett et al. patent does not teach that the statements are privately and securely e-mailed. Instead, the Doggett et al. patent illustrates the statements being provided to the payer (customer) in a manner separate and distinct from the Internet or the e-mail network.

Other feature described in the Doggett et al. patent include the Application Programming Interface (API) which processes ancillary electronic messages, such as acknowledgment of deposit, returned checks, and electronic statements. However, the electronic statements are not described as mandated periodic statements.

The Doggett et al. patent also describes the security and authentication procedures used when sending an electronic financial instrument. The Doggett et al. patent describes the use of electronic digital signatures and public key cryptography. As described, a consumer electronically receives a memorandum which may contain the payee's digital signature generated by the payee's secure authenticator using public key cryptography. The payer (customer) validates the payee's signature by using the payer's public key to verify the payee's digital signature and, thereby, authenticates the payee. Furthermore, digital representation of a verifiable certificate by an institution of authenticity of the instrument is appended to the instrument. Additionally, the Doggett et al. patent also describes creating and maintaining account certificates and bank certificates.

U.S. Pat. No. 5,465,206, issued to Hilt et al., entitled "ELECTRONIC BILL PAY SYSTEM," describes, in brief, "material" which refers to documents and/or information, whether paper-based ("postal mail"), electronic (e-mail, messages, packets, etc.) or other transfer medium. Furthermore, the "material" is described to include a statement which is sent from Bank C to confirm that a transaction has gone through. Otherwise, the Hilt et al. patent is essentially silent with respect to the method of transmission or contents of such statement.

U.S. Pat. No. 5,093,787, issued to Simmons, entitled "ELECTRONIC CHECKBOOK WITH AUTOMATIC RECONCILIATION" discloses an Electronic Check Register (ECR) that can fit in the check book cover slot wherein the ECR communicates with a host Automatically Balanced Checking (ABC) system. The Simmons patent provides a statement that not only reflects all transactions (including those just prior the automatic reconciliation) but displays, on the statement, the full check image with (in addition to the usual check number, date and amount) complete Payee and Purpose of Payment information to allow the user to print up to the minute transactions. However, the full check image of the Simmons patent is not described as a pictorial image of the actual paper check and is illustrated as a printed line of text conveying the check number, date, amount, etc. Additionally, the Simmons patent discloses the use of electronic mail for the transmission of notifications regarding potential errors. Furthermore, the Simmons patent discloses a communication module with a modem permanently attached enabling the user to communicate with the host over a telephone line. Thus, the communications with the host are initiated by the user and not the banking institution.

U.S. Pat. No. 5,739,512, issued to Tognazzini, entitled "DIGITAL DELIVERY OF RECEIPTS" discloses sending electronically, via e-mail, a digital receipt of a transaction, such as, the result of a purchase using a vendor's system or a credit card company. The appendage of a digital signature to the digital receipt information is described as insuring authenticity.

U.S. Pat. No. 5,699,528, issued to Hogan, entitled "SYSTEM AND METHOD FOR BILL DELIVERY AND PAYMENT OVER A COMMUNICATION NETWORK" discloses, in a second embodiment, a billing system which sends the user electronic bills in the form of electronic mail to their e-mail address. The user has the ability to view the electronic bill. Unlike the Hogan invention, the mandated periodic statement of the present invention includes pictorial images of cleared checks. Moreover, the Hogan patent is silent with respect to security and verification aspects of the e-mailed bills.

U.S. Pat. No. 5,655,089, issued to Bucci, entitled "METHOD FOR THE CONSOLIDATION SUMMARIZATION AND TRANSMISSION OF A PLURALITY OF MAILABLE MATERIALS" discloses a Universal Mail Transmittal Service which establishes a database of customer information, statements, bills, etc., for addressees from different subscribers. The Universal Mail Transmittal Service accumulates input records for each identified address which is later developed into a unitized transmission which can be printed. The unitized transmission is intended to include billing information from numerous institutions/ subscribers. The Bucci patent further describes, as an option, electronically transmitting the accumulated information to end users by an appropriate modem, tape or disk. Although, the Bucci patent mentions in the "BACKGROUND OF THE INVENTION" that banks and other institutions mail records, bills and other documents monthly, the use of the Universal Mail Transmittal Service by banks is not described.

U.S. Pat. No. 5,373,550, issued to Campbell et al., entitled "TRANSMISSION OF CHECK IMAGES BY WAY OF PUBLIC SWITCHED TELEPHONE NETWORK" discloses, in general, sending from one institution (the bank of first deposit) to another institution (the payor bank) images of checks including both back and front images over a public switched telephone network via a check image processing node providing check clearance services. The check imaging equipment, as described, may comprise systems which scan the front face, the back face or both the front and back faces of a check, as required, to create a series of intensity or color signals for each picture element making up the scanned surfaces of the check. The check image processing equipment may be facsimile equipment, character recognition equipment, an e-mail system or any other image processing equipment by which the images received may be displayed or used by the receiving institution.

It can be readily seen that there exists a continuing need for a banking system having multi-mode delivery of bank notices, advices and mandated periodic statements wherein the banking system integrates into it's existing system an e-mail controller which strips or purges from a batch of records (adapted to be printed for mailed delivery of bank notices or advices or mandated periodic statements) those records which are associated with e-mail recipient customers and e-mails the stripped or purged records instead of printing such records. Thereby, there is little or no need to reprogram or reconfigure the existing banking system to accommodate e-mail transmissions of bank notices or advices and the mandated periodic statements.

It can be readily seen that there is a continuing need for an e-mailer controller which is adapted to append pictorial check images to the mandated periodic statements.

There is still a continuing need for an electronic-mail bank system which sends mandated periodic statements and bank notices or advices to e-mail recipients via the Internet, other e-mail networks or the like.

Moreover, there is still a continuing need for an electronic-mail bank system which sends electronically-mailed bank notices or advices and mandated periodic statements. securely and privately.

As will be seen more fully below, the present invention is substantially different in structure, methodology and approach from that of the prior systems providing electronic statements.

SUMMARY OF THE INVENTION

The preferred embodiment of the e-mailer controller of the present invention solves the aforementioned problems in a straight forward and simple manner.

Broadly, what is provided is an e-mailer controller which is adapted to interface with an existing bank system providing printed bank notices or advices and mandated periodic (monthly) statements to e-mail bank notices or advices and mandated periodic (monthly) statements to those customers designated as e-mail recipients. An existing bank system equipped with an e-mailer controller can function as an electronic-mail banking system when all the banking institutions' customers are e-mail recipients.

In view of the above, an object of the present invention is to provide an e-mailer controller for use in a banking system comprising: an electronic formatted mandated periodic statement shell adapted to have inserted therein a text record of a plurality of banking transactions for a customer account; an image link appender capable of inserting at least one image link in said electronic formatted mandated periodic statement shell wherein said at least one image link defines an electronic path to at least one pictorial image of a hardcopy bank instrument identifying at least one bank transaction of said plurality of bank transactions; a document assembler adapted to assemble a mandated periodic statement from said electronic formatted mandated periodic statement shell and said at least one pictorial image; an electronic-mail creator which formats the assembled mandated periodic statement using a standardized electronic-mail transfer protocol into an electronic mandated periodic statement mail; and, an electronic-mailer adapted to securely and privately electronically mail said electronic mandated periodic statement mail to an e-mail address for said customer account via the Internet, other e-mail networks or the like.

Another object of the present invention is to provide pictorial images in the electronically mailed mandated periodic statement of at least one hardcopy bank instrument wherein hardcopy bank instruments include serial numbered hardcopy bank instruments and/or non-serial numbered hardcopy bank instruments.

A further object of the present invention is to provide pictorial images of hardcopy bank instruments in accordance with customer preferences.

A still further object of the present invention is to provide an e-mailer controller which e-mails privately and securely bank notices or advices, such as, without limitation, account sweep transactions, NSF notice, deposit correction notices, etc.

It is a still further object of the present invention to provide an e-mailer controller which e-mails NSF notices which may include the pictorial check image of the front view, back view or front and back views of a returned check.

It is a still further object of the present invention to provide an e-mailer controller which employs the Secure/ Multipurpose Internet Mail Extensions protocol (S/MIME) to digitally sign and encrypt with a session key or symmetric key the mandated periodic statement mail or the bank notice and advice statement mail.

A still further object of the present invention is to provide an e-mailer controller with an electronic-mailer which includes an electronic digital signature creator adapted to electronically sign the electronic mandated periodic statement mail with a banking institution's digital signature; and, an encryptor adapted to encrypt the digitally signed mandated periodic statement mail.

A still further object of the present invention is to provide a formatted mandated periodic statement shell which includes a graphic link wherein the graphic link identifies an electronic path to a banking institution's letterhead or logo.

A still further object of the present invention is to provide a formatted mandated periodic statement shell which is a HTML formatted document and wherein the at least one image link and the graphic link are HTML links.

A still further object of the present invention is to provide a page-formatter which formats the assembled electronic mandated periodic statement using a page markup standard such as an Abode Acrobat file standard.

A still further object of the present invention is to provide the e-mailer controller with a customer preference database defining at least one customer preference for presentation of the hardcopy bank instruments in the mandated periodic statement and wherein the image link appender determines the at least one image link based on the at least one customer preference.

A still further object of the present invention is to provide an e-mailer controller which creates mandated periodic statements in accordance with preestablished customer preferences wherein the preestablished customer preferences include the manner in which pictorial images should be presented, such as, only front views of checks or hardcopy bank instruments, only back views of checks or hardcopy bank instruments, front and back views of checks or hardcopy bank instruments, a minimum dollar value for inclusion of pictorial images, and presentation of non-serial numbered hardcopy bank instruments initiating a bank transaction, such as deposit slips, withdrawal slips, etc.

A still further object of the present invention is to provide an e-mailer controller which further comprises: a port coupled to the banking system to transfer from the banking system a master text file of a plurality of text records wherein each record includes the plurality of banking transactions for the mandated periodic statement for a respective customer account; an e-mail recipient database identifying a plurality of customer accounts as e-mail recipients; and, a master file separator which separates from the master text file those records of the plurality of text records identified for the e-mail recipients into a first file and the remaining records of the plurality of text records are separated into a second file.

A still further object of the present invention is to provide an e-mailer controller with a router adapted to route the second file back to the banking system.

A still further object of the present invention is to provide an e-mailer controller which further comprises: an electronic formatted bank document shell adapted to have inserted therein a text record of a bank notice or advice for a respective customer account; wherein the document assembler is adapted to assemble a bank notice or advice statement from the electronic formatted bank document shell; wherein the electronic-mail creator is adapted to format the assembled bank notice or advice statement using a standardized electronic-mail transfer protocol into an electronic bank notice or advice statement mail; and, wherein the electronic-mailer is adapted to securely and privately electronically mail the electronic bank notice or advice statement mail to an e-mail address for the respective customer account via the Internet, other e-mail networks or the like.

A still further object of the present invention is to provide an e-mailer controller which includes an image link appender which is adapted to insert at least one image link in the electronic formatted bank document shell wherein the at least one image link defines an electronic path to at least one pictorial image of a hardcopy bank instrument identified in the text record of the bank notice or advice.

It is a still further object of the present invention to provide an electronic-mail banking system comprising: means for cyclically assembling a mandated periodic statement of bank transactions identified for a predetermined cyclical time period and those pictorial images of a plurality of images of hardcopy bank instruments identifying at least part of the bank transactions to create an assembled mandated periodic statement mail for each account of a plurality of accounts; and, means for securely and privately e-mailing the assembled mandated periodic statement mail for the each account.

A still further object of the present invention is to provide an electronic-mail banking system further comprising means for determining a non sufficient fund status for clearing any of the checks for any of the plurality of accounts; means for creating an image of an NSF check; and, means for creating an NSF statement indicating the non sufficient fund status wherein the e-mailing means is adapted to electronically mail the NSF statement with the image of the NSF check.

It is a still further object of the present invention to provide an electronic-mail bank system comprising: means for creating a plurality of images of a plurality of hardcopy bank instruments for a plurality of accounts; means for cyclically generating a mandated periodic statement of bank transactions for a predetermined cyclical time period for each account of the plurality of accounts; means for assembling the mandated periodic statement and those images of the plurality of images identifying at least part of the bank transactions to create an assembled mandated periodic statement mail for each account; and, means for privately and securely e-mailing the assembled mandated periodic statement mail for each account.

It is a still further object of the present invention to provide an electronic-mail banking system comprising: means for creating a plurality of images of a plurality of hardcopy bank instruments for each account of a plurality of accounts; means for cyclically generating a mandated periodic statement identifying a plurality of bank accounting transactions for a predetermined cyclical time period for each account; means for linking those images of the plurality of images to the mandated periodic statement identifying at least part of the plurality of bank accounting transactions for the predetermined cyclical time; means for assembling the mandated periodic statement and those images of the plurality of images to create an assembled mandated periodic statement mail for each account; and, means for privately and securely e-mailing the digitally signed assembled mandated periodic statement mail for each account.

It is a still further object of the present invention to provide a multi-mode banking system comprising: means for creating a plurality of images of a plurality of hardcopy bank instruments for each account of a plurality of accounts; means for cyclically generating a mandated periodic text statement of a plurality of bank accounting transactions of a predetermined cyclical time period for said each account of said plurality of accounts; means for determining those accounts of said plurality of accounts which are for e-mail recipients; means for assembling said mandated periodic text statement and those images of said plurality of images identifying said plurality of bank accounting transactions of said predetermined cyclical time period to create an assembled mandated periodic text statement for said each account of said plurality of accounts; means for securely and privately e-mailing said assembled mandated periodic text statement for said those accounts of said e-mail recipients; and, means for printing said assembled mandated periodic text statement for any remaining accounts.

It is a still further object of the present invention to provide an electronic-mail banking system comprising: a central repository which cyclically creates a mandated periodic statement of bank transactions identified for a predetermined cyclical time period and identifies those image links to pictorial images of hardcopy bank instruments identifying at least part of said bank transactions for each account of a plurality of accounts; an image database having stored therein said images of hardcopy bank instruments; and, an e-mail controller, coupled to said central repository and said image database, which assembles an electronic mandated periodic statement and retrieves said pictorial images via said image links and securely and privately e-mails the assembled mandated periodic statement with the retrieved pictorial images for said each account.

The above and other objects of the present invention will become apparent from the drawings, the description given herein, and the appended claims.

BRIEF DESCRIPTION OF DRAWINGS

For a further understanding of the nature and objects of the resent invention, reference should be had to the following detailed description, taken in conjunction with the accompanying drawings, in which like elements are given the same or analogous reference numbers and wherein.

DESCRIPTION OF THE EXEMPLARY EMBODIMENT

Figure 1:
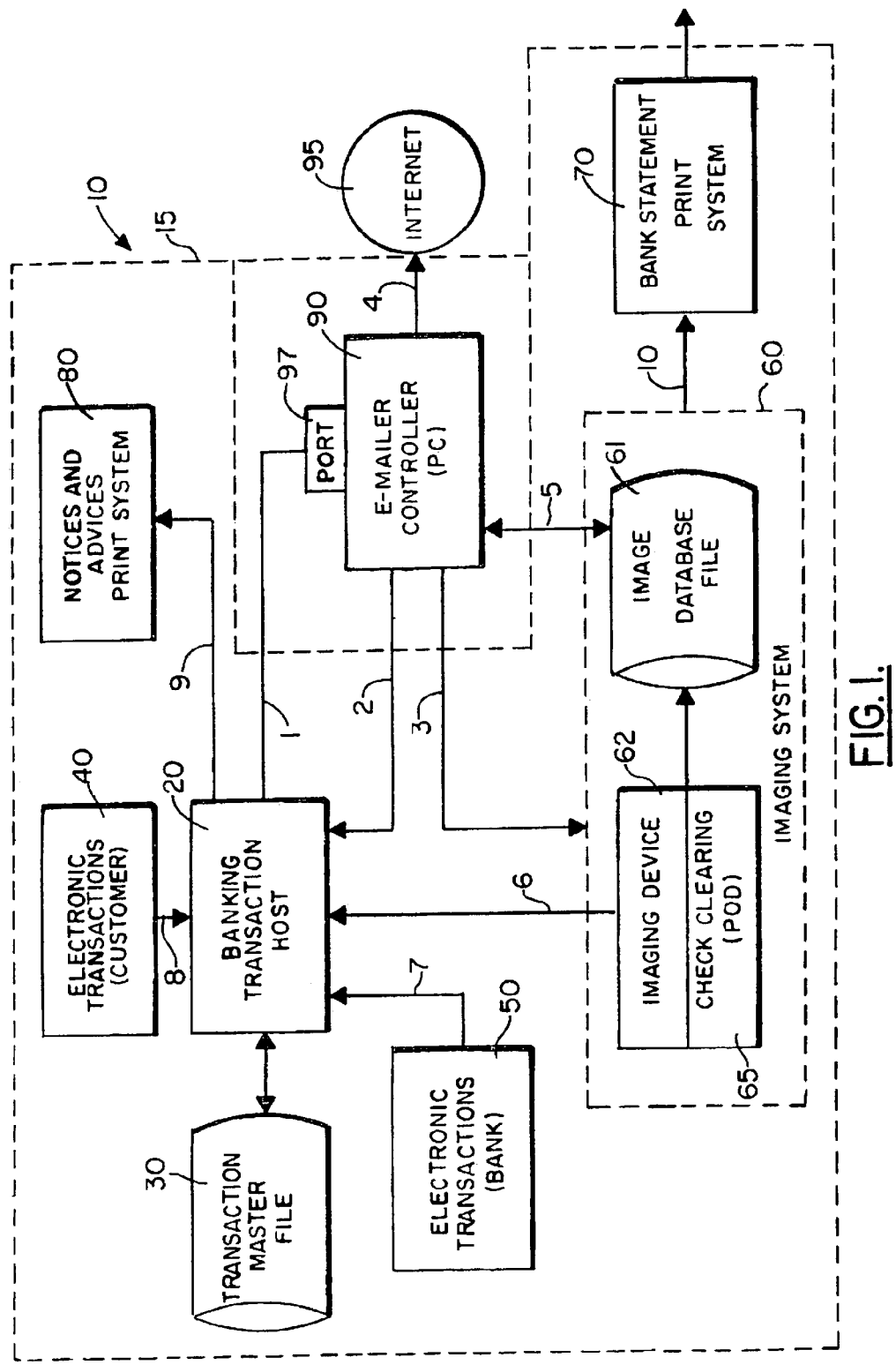
FIG. 1 illustrates a general block diagram of the banking system having multi-mode delivery of bank notices, advices and mandated periodic statements of the present invention.

Referring now to the drawings, and in particular FIG. 1, the banking system having multi-mode delivery of bank notices, advices and mandated periodic statements of the present invention is 5 designated generally by the numeral 10. Banking system 10 is, in general, comprised of a conventional or existing banking system 15 having interfaced therewith e-mailer controller 90. The components of the conventional or existing banking system 15 are well known and the procedures and protocols for carrying out the banking functions have been well established and standardized. A conventional or existing banking system 15 is defined as a banking system which creates a master file for bank notices or advices and/or a master file for the mandated periodic statements which are to be printed. In the exemplary embodiment, e-mailer controller 90 is a personal computer having processor 85 and which in communications with banking system 10.

Nevertheless, in lieu of a personal computer the e-mailer controller may be integrated into components of the conventional or existing banking system 15.

Broadly, conventional or existing banking system 15 includes banking transaction host 20 with an associated transaction master file 30 for recording all modalities of banking transactions and at least one printing system 70 and 80 for delivery of printed bank notices, advices and mandated periodic statements via the postal service. While mandated periodic statements are described herein as monthly statements, it should be understood that any periodic interval may be used to create such statements.

In the exemplary embodiment, one modality of recording a banking transaction is provided by proof-of-deposit (POD) imaging system 60 wherein imaging system 60 records those transactions resulting from hardcopy bank instruments, such as, the result of cashing a paper check, in banking transaction host 20. As described above, not all banking institutions include in their existing banking system imaging system 60. In the preferred embodiment, conventional banking system 15 is provided with imaging system 60 to allow pictorial images of hardcopy bank instruments to be electronically created and stored. Thus, since conventional banking system 15 of the type described herein has stored pictorial images of hardcopy bank instruments such as cleared paper checks, the e-mailed mandated periodic statement 300 can likewise be provided with such images of cleared paper checks.

The imaging system 60 includes image database file 61, imaging device 62 and check clearing/proof-of-deposit (POD) subsystem 65. In general, imaging device 62 scans the front view and back view of all hardcopy bank instruments, such as, paper checks, deposit slips, etc., presented at the banking institution or in other words, the Bank of First Presentation. Furthermore, imaging device 62 (means for creating a plurality of images of a plurality of hardcopy bank instruments for each account of a plurality of accounts) sorts the checks for those having accounts held by the Bank of First Presentation and for those checks having accounts held by other banking institutions.

Each deposit-type banking transaction is checked by check clearing/POD subsystem 65. For example, deposit-type banking transactions may include a deposit slip and at least one paper check to be deposited into a customer's bank account. Nevertheless, there are numerous banking transactions capable of being transacted as a result of various hardcopy bank instruments, such as, without limitation, paper checks, withdrawal slips and/or deposit slips.

After, the hardcopy bank instruments have been scanned and imaged, the pictorial images of the hardcopy bank instruments are sent to check clearing/POD subsystem 65 wherein bank personnel balance all banking transactions and manually enter the dollar value of the paper check or hardcopy bank instrument and other information necessary to post the transaction. For example, a serial number or an account number may need to be entered.

If there is an accounting error on any deposit-type banking transaction resulting in an unbalanced banking transaction, the accounting error is corrected and the bank customer is notified of the accounting error via a bank notice or advice. Such bank notice or advice is a deposit correction notice.

After the banking transactions have been proofed, check clearing/POD subsystem 65 transfers the banking transactions via line 6 to banking transaction host 20 for recording such banking transactions in transaction master file 30. Furthermore, the electronic pictorial images of the paper checks are stored in image database file 61.

Conventional banking system 15 further comprises customer-generated electronic transaction module 40 and bank-generated electronic transaction module 50 in communication with banking transaction host 20 via lines 8 and 7, respectively, for recording banking transactions in transaction master file 30 resulting from electronic banking transactions generated by the customer and electronic banking transactions generated by the banking institution, respectively. For example, customer-generated electronic banking transactions include automatic teller machine (ATM) transactions, automatic clearing house (ACH) transactions, point-of-sale (POS) transactions, etc. Examples of bank-generated electronic transactions include debiting of bank service fees (monthly fees, overdraft fees, etc.) and crediting of interest to saving accounts or to interest occurring checking accounts, etc.

In the exemplary embodiment, banking transaction host 20 is an AS400 manufactured by International Business Machines (IBM) or other compatible substitution.

A function of banking transaction host 20 is to generate daily bank notices or advices, such as NSF notices, sweep notices, etc., mandated by the banking authority. For example, when a "sweep" transaction (transfer of funds from one account to another account) takes place, the customer is provided with a bank notice and advice detailing such "sweep" transaction. Each and every time a "sweep" transaction takes place a bank notice and advice is generated. Additionally, if a paper check is not cleared, due to insufficient funds in a customer's account, an NSF notice is generated. In the preferred embodiment, the e-mailed NSF notice includes an electronic pictorial image of the front view, the back view or the front view and back view of the NSF check. However, those bank notices or advices which are e-mailed and are not responsive to a hardcopy bank instrument or paper check do not have images included therewith.

Banking transaction host 20 (the central repository) is programed to function as the means for cyclically generating a mandated periodic statement of a plurality of bank accounting transactions of a predetermined cyclical time period for the accounts. Moreover, banking transaction host 20 is programed to function as a means for determining a non sufficient fund status for clearing any of the checks for any of said plurality of accounts; and the means for creating a NSF statement indicating a non sufficient fund status.

Referring also to FIGS. 5a–5i, in addition to bank notices or advices, banking transaction host 20 creates on a cyclical or periodic basis a mandated periodic statement of transactions 300 itemizing all banking transactions and other transactions affecting the account for a specified period of time. Typically, a mandated periodic statement of transactions 300 includes beginning (previous) balance 315a and an ending (current) balance 315b. In general, banking institutions are mandated by the banking authority to send, typically, once a month, a mandated periodic statement for each customer bank account. However, not all mandated periodic statements are generated on the same monthly anniversary. Instead, the customer bank accounts are sectioned into a plurality of batches wherein each batch of customer bank accounts has a different monthly anniversary. Thus, bank transaction host 20 on a given monthly anniversary will generate a batched file having a plurality of customer records wherein each customer record itemizes the customer's bank transactions transacted since the last monthly anniversary.

The separation of the customer accounts into batches for generation of the customer's mandated periodic statements is a function of the time for printing, stuffing and mailing. Typically, it is not practical to print, stuff and mail all mandated periodic statements on the same day. However, a banking system which only e-mails mandated periodic statements 300 may e-mail all of such statements on the same day, if desired.

Banking transaction host 20, on a daily basis, creates a master ASCII text (batch) file of bank notices or advices and/or, alternately, a master ASCII text (batch) file of banking transaction records for a plurality of customer accounts wherein the customer accounts having a month anniversary corresponding to the day's date. The master ASCII text (batch) file of bank notices or advices includes a plurality of ASCII text records wherein each SCII text record includes the text of the bank notice and advice for a customer bank account detailing the notice or advice.

It should be noted that each ASCII text record has included therewith tags such as for the customer's account number. Those ASCII text records having banking transactions for the mandated periodic statement also include image links identifying those banking transactions in the record resulting from a hardcopy bank instrument. A text record for an NSF notice would also include at least one image link to identify the path to a returned check. Thus, when the term text record or ASCII text record is referenced, such term includes the text and any tags (customer account number, image links, etc.) associated therewith.

Moreover, the banking transaction records are ASCII text records wherein each ASCII text record includes the text of the itemized banking transactions for a customer bank account since the last anniversary date. In the exemplary embodiment, each ASCII text record of the master ASCII text file of bank notices or advices is printed by notices or advices print system 80. On the other hand, each ASCII text record of the master ASCII text file of banking transactions for the mandated periodic statement is printed by bank statement print system 70.

The printing systems 70 and 80 are designated as separate since most bank notices or advices do not require an electronic pictorial image to be printed. In general, printing system 80 prints each ASCII text record of the master ASCII text file of banking transactions and the electronic pictorial images stored in image database 61 for at least part of the banking transactions itemized in such ASCII text record.

In the past, the master ASCII text file of bank notices or advices was sent directly to notices or advices print system 80 while the master ASCII text file of banking transactions was sent directly to imaging system 60 for printing of the mandated periodic statement by bank statement print system 70.

Figure 3:
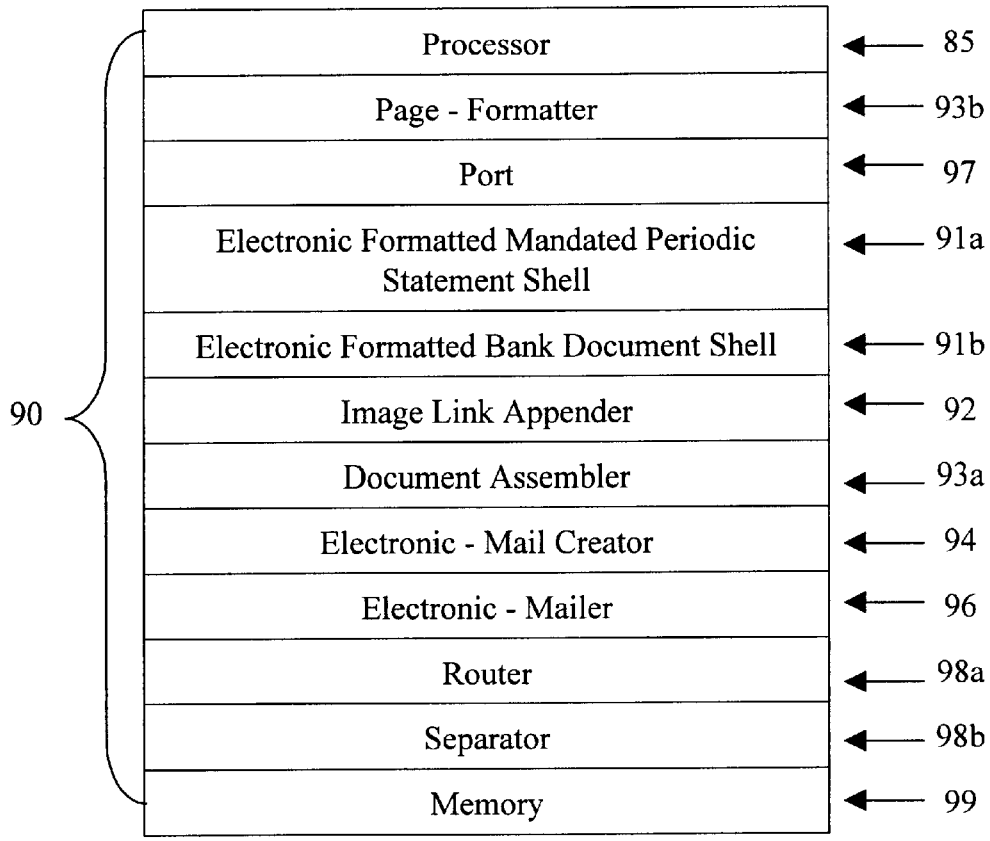
FIG. 3 illustrates a general block diagram of the e-mailer controller of the present invention.

Referring also to FIG. 3, in the present invention, the master ASCII text file of bank notices or advices and the master ASCII text file of banking transactions are routed to port 97 of e-mailer controller 90 via line 1. E-mailer controller 90 separates the ASCII text records of the master ASCII text file of bank notices or advices into two ASCII text files depending on the mode of delivery (i.e., mailed and delivered via the postal service or, alternately, e-mailed delivery via the Internet or the like) via separator 98b of e-mailer controller 90. The first ASCII text file is for bank notices or advices to be e-mailed delivered via Internet 95, other e-mail networks or the like and the second ASCII text file is for bank notices or advices to be printed by notices or advices print system 80 and thereafter mailed and delivered via the postal service.

In the exemplary embodiment, the second file of the bank notices or advices is sent back to banking transaction host 20 on line 2 via router 98a of e-mailer controller 90. Thereafter, banking transaction host 20 sends the second file of bank notices or advices to the notices or advices print system 80. While, the present invention uses an ASCII text format, other text formats may be substituted.

Alternately, the master ASCII text file of banking transaction on line 1 is likewise divided into two ASCII text files depending on the mode of delivery (i.e., mailed and delivered via the postal service or, alternately, e-mailed delivery via the Internet, other e-mail networks or the like) via separator 98b of e-mailer controller 90. The first ASCII text file is for mandated periodic statements to be e-mailed delivered via Internet 95, other e-mail networks or the like and the second ASCII text file is for mandated periodic statements to be printed by bank statement print system 70 and thereafter mailed and delivered via the postal service.

In the exemplary embodiment, the second ASCII text file of the banking transactions for the mandated periodic statements is sent to imaging system 60 on line 3 via router 98a. Thereafter, imaging system 60 retrieves the electronic pictorial images of the cleared paper checks (hardcopy bank instruments) for at least part of the banking transactions itemized in the ASCII text record for a customer account and sends the pictorial images and ASCII text record for a customer account to the bank statement print system 70. The mandated periodic statement is printed, mailed and delivered via the postal service.

E-mailer controller 90 includes an electronic formatted mandated periodic statement shell 91a which is adapted to have inserted therein an ASCII text record of a plurality of banking transactions for a customer account. Additionally, there is an electronic formatted bank document shell 91b used for electronically mailing bank notices or advices and is adapted to have inserted therein an ASCII text record of a bank notice or advice for a respective customer account. In the preferred embodiment, electronic formatted mandated periodic statement shell 91a and electronic formatted bank document shell 91b are dynamic and HTML formatted documents. Shells 91a and 91b include graphic links to the bank's letterhead or logo 310. Preferably, graphic and image links are HTML links.

E-mailer controller 90 further includes image link appender 92 which is capable of inserting at least one image link in said electronic formatted mandated periodic statement shell 91a wherein an image link defines an electronic path to a pictorial image of a hardcopy bank instrument identifying a bank transaction stored in image database 61. In the present invention, there are two image links for each hardcopy bank instrument. One of the image links defines the electronic path to the front view of the hardcopy bank instrument and the second image link defines the electronic path to the back view. It should be noted that only those image links in a record which are for those electronic pictorial images which meet the customer's preferences will be included.

E-mailer controller 90 further includes document assembler 93a which is adapted to assemble a mandated periodic statement 300 from the electronic formatted mandated periodic statement shell 91a and the at least one pictorial image retrieved from image database 61. After assembler 93a has assembled the mandated periodic statement, electronic-mail creator 94 creates an electronic mandated periodic statement mail using a standardized electronic-mail transfer protocol. Electronic-mail creator 94 creates an electronic mandated periodic statement mail using a simple mail transfer protocol (SMTP).

In the preferred embodiment, prior to creating an electronic mandated periodic statement mail, the assembled mandated periodic statement is formatted using a page markup standard via pageformatter 93b. In the preferred embodiment, the page-formatter uses a universal page markup standard, such as, without limitation, an Abode Acrobat file standard.

Document assembler 93a is also adapted to assemble a bank notice or advice statement from the electronic formatted bank document shell 91b. Page-formatter 93b is adapted to universally format the assembled bank notice or advice statement. Moreover, electronic-mail creator 94 creates an electronic bank notice or advice statement mail using a standardized electronic-mail transfer protocol. It should be noted that image link appender 92 is adapted to insert at least one image link in the electronic formatted bank document shell 91b wherein the at least one image link defines an electronic path to at least one pictorial image of a hardcopy bank instrument identified in the ASCII text record of the bank notice or advice.

E-mailer controller 90 further includes electronic-mailer 96 which is adapted to securely and privately electronically mail the electronic mandated periodic statement mail to the e-mail address for a customer account via Internet 95, other e-mail networks or the like.

S/MIME, Secure Multipurpose Internet Mail Extension, is a leading protocol for digitally signing and encrypting e-mail messages using the syntax given in Public-key Cryptography Standard (PKCS) #7, incorporated herein by reference. Nevertheless, other protocols or standards, such as, Secure Sockets Layer (SSL) developed by Netscape Communications Corporation, which defines the secure communications between web servers (e.g., PNB Online Banking) can be used. S/MIME, SSL and other details regarding cryptography, such as, private keys, public keys, digital certificates, etc., are described in RSA Laboratories Frequently Asked Questions About Today's Cryptography, v4.0, copyright 1998, incorporated herein by reference.

Electronic-mailer 96 uses two distinct processes to privately and securely electronically mail the mandated periodic statement mail or the bank notice and advice statement mail. These processes are (1) digital signing to assure authenticity and (2) encryption to assure privacy. In the preferred embodiment of the present invention, e-mailer controller 90 has its own digital certificate (hereinafter referred to as the "banking institutions' digital certificate"), or public/private key pair. Moreover, e-mailer controller 90 has stored in internal memory 99 the digital certificate having a public/private key pair for each e-mail recipient.

These key pairs should be generated by S/MIME compliant Providers and authenticated by a Certificate Authority (CA). A CA can be any party trusted by both the banking institution and the e-mail recipient. In the US, the largest CA is Verisign.

It is well known, in public/private key cryptography, that only what one key encrypts, only the other key can decrypt. That is, the keys of the pair are "asymmetric," or one-way. Thus, when e-mailer controller 90 encrypts the mandated periodic statement with a private key, only the public key of the public, private key pair can decrypt the otherwise encrypted mandated periodic statement, even if the private key is known.

In general, the digital signing and encryption processes by electronic-mailer 96 include the following:

(a) using the customer's (e-mail recipients') digital certificate, stored in internal memory 99 of e-mailer controller 90, a hash or message digest is generated;

(b) the hash is then encrypted using the banking institutions' (sender's) private key to thereby create the banking institutions' digital signature;

(c) the digital signature is then attached to the original message (i.e., the mandated periodic statement mail or, alternatively, a bank notice and advice statement mail);

(d) a session key is generated;
(e) the session key is used to encrypt the original message; and,
(f) the customer's (e-mail recipients') public key, obtained from the stored customer's digital certificate, is used to encrypt the session key.

Hence what is transmitted via Internet 95, other e-mail networks or the like and thus received by the e-mail recipient includes, in general, (1) an encrypted message, (2) the digital signature and (3) the encrypted session key.

In an alternate embodiment, since the algorithms for public, private key pairs are computationally expensive, symmetric keys or the like, which are not computationally taxing can be used to encrypt the original message.

In order for the e-mail recipient to review the e-mailed transmission of the original message (i.e., the mandated periodic statement mail or, alternatively, a bank notice and advice statement mail), the recipient should (1) use his private key to decrypt the session key; (2) decrypt the original message using the session key; (3) decrypt the hash using the banking institutions (sender's) public key; and, (4) re-hash the original, now decrypted, message.

Only the recipient's private key can decrypt the session key since the session key was encrypted using the recipient's public key. Additionally, the banking institutions (sender's) private key was used to encrypt the hash and, therefore, only the banking institutions (sender's) public key can decrypt the hash. Thus, when the e-mail recipient re-hashes the original message, if the two hashes (the one sent with the original message and the one created when the original message is re-hashed) are equal, then the message has not been altered during transmission through Internet 95, other e-mail networks or the like. However, if the two hashes are not equal, the original message has been changed and is considered suspect.

The digital signing and encryption processes of the present invention allow the e-mail recipient to know that the banking institution is the entity actually sending the original message. In other words, since the keys are asymmetric, only the banking institutions' (sender's) private key could be used to encrypt the hash. Otherwise, the banking institutions' (sender's) public key would not have successfully decrypted the hash and the two hashes would not compare equally.

Furthermore, the digital signing and encryption processes of the present invention allow the e-mail recipient to know that the original message was sent in a form only retrievable by the recipient since the recipients' private key was used to decrypt the session key originally encrypted using the recipient's public key. Only the recipient's private key can decrypt what the recipient's public key encrypts. Since only the recipient has access to his own private key, only the recipient can decrypt the original message.

Moreover, the banking institution knows that only the intended e-mail recipient can successfully open and read the original message (i.e., the mandated periodic statement mail or, alternatively, a bank notice and advice statement mail). Even if someone else intercepts the original message in transit, only the intended recipient can successfully decrypt the session key since the banking institution (sender) used the recipient's public key to encrypt the session key wherein the session key can only be decrypted using the recipient's private key.

The banking institution is also assured that a complete original message is received by the recipient. In other words, if the original message is altered in transit, the hashes will not be equal. Thus, the receiving party will discard that which was received.

After the e-mail recipient has decrypted the original message, the e-mail recipient may then read the greeting message. However, to open the attached SMTP e-mail mandated periodic statement, the SMTP e-mail mandated periodic statement should be opened via an the Abode Acrobat reader or the like depending the particular format of the universally accepted page markup standard.

Figure 4:
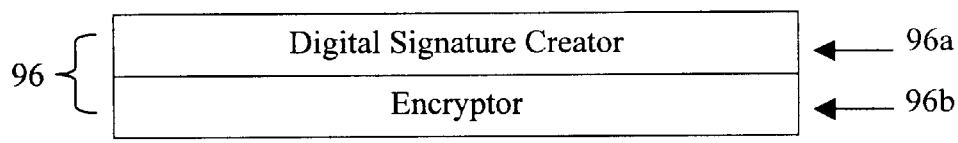
FIG. 4 illustrates a general block diagram of the electronic-mailer of the present invention; and, FIGS. 5a–5i illustrates an e-mailed mandated periodic statement of the present invention.

Thus, in general, referring now to FIG. 4, electronic-mailer 96 includes electronic digital signature creator 96a which is adapted to electronically digitally sign the electronic mandated periodic statement mail with a banking institution's digital signature. Electronic-mailer 96 also includes encryptor 96b adapted to encrypt the digitally signed mandated periodic statement mail using the session key. Nevertheless, a symmetric key may be substituted.

Figure 5F:
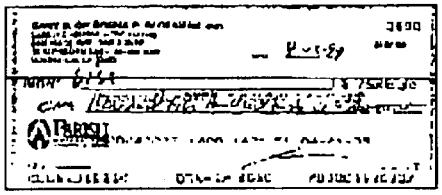

Referring now to FIGS. 5a–5i, an exemplary embodiment of an e-mailed mandated periodic statement 300 is shown. Mandated periodic statement 300 includes at the top of each text page, as best seen in FIGS. 5a–5c, letterhead or logo 310. Below the letterhead or logo 310 of each page, the text of mandated periodic statement 300 itemizing each banking transaction for the customer account since the last anniversary date is provided. Moreover, mandated periodic statement 300 includes beginning (previous) balance 315a and ending (current) balance 315b.

Referring now to FIG. 5b, a list of itemized check numbers is shown in section 320. The pictorial images of the itemized check numbers are best seen in FIGS. 5d–5h. In the exemplary embodiment, both front view 330a and back view 330b of each and every cleared check are shown. However, mandated periodic statement 300 may only include front view 330a or only bank view 330b of each and every cleared check.

In the preferred embodiment, below each and every pictorial image there is provided transaction line 340 which includes a date of transaction, a check number or a number of a serial numbered hardcopy bank instrument and an amount. The date of the transaction is the date the check or serial numbered hardcopy bank instrument was cleared or posted. In general, the transaction line 340 provided below each and every pictorial image can be found in the itemized bank transactions of the text pages (FIGS. 5a–5c).

Referring to FIG. 5d, mandated periodic statement 300 further includes a pictorial image of non-serial numbered hardcopy bank instrument 370 drawn on the account. In the exemplary embodiment, both front view 331a and back view 331b of such non-serial numbered hardcopy bank instrument 370 are included. Moreover, there is a transaction line 341 included below non-serial numbered hardcopy bank instrument 370.

Referring now to FIG. 5i, in the preferred embodiment, mandated periodic statement 300 includes account reconciliation form 360 to assist the customer with reconciling their account and to identify possible errors.

Figure 2:
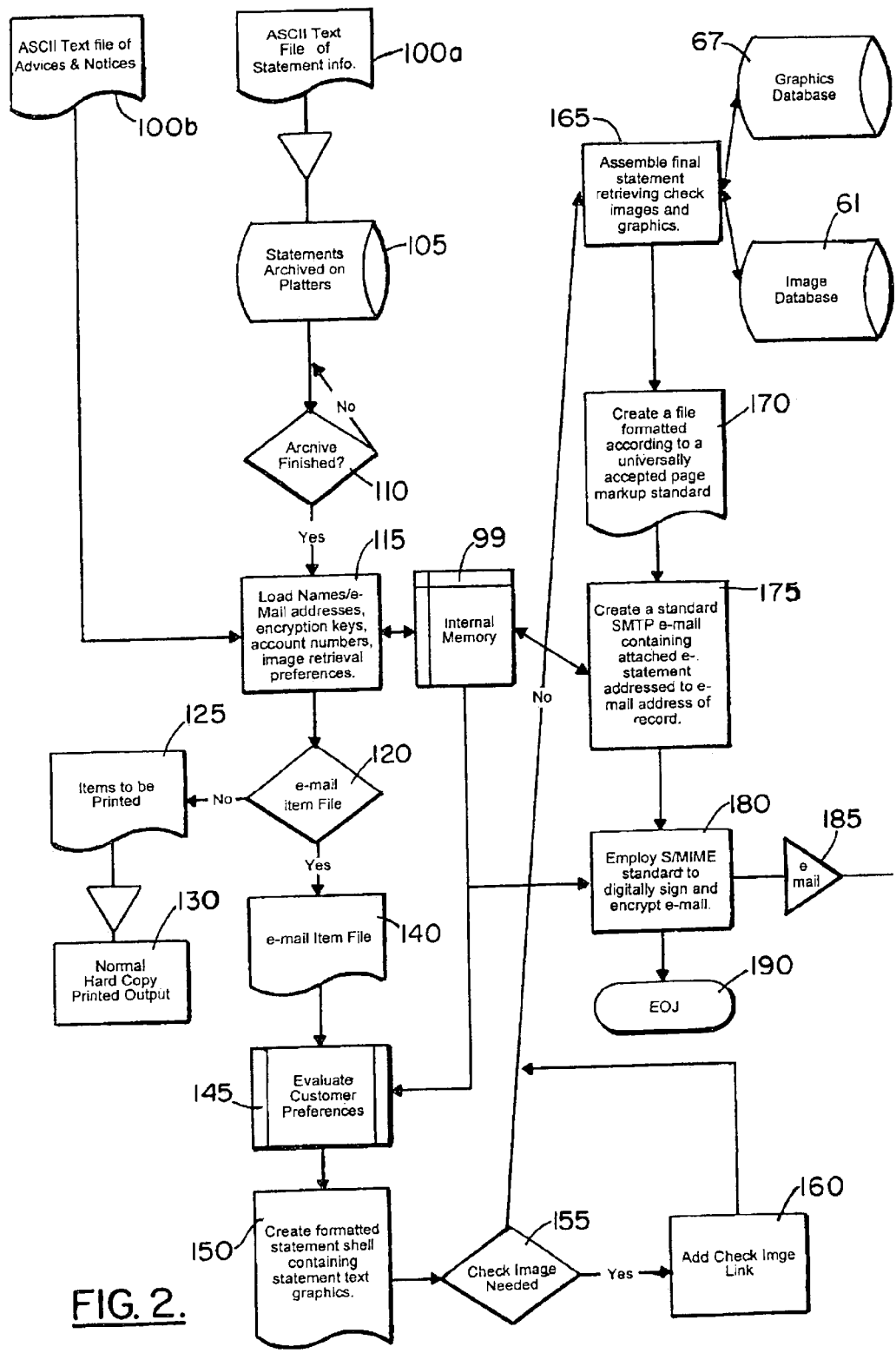
FIG. 2 illustrates the flow chart for the banking system having multi-mode delivery of bank notices, advices and mandated periodic statements.

Referring now to FIG. 2, the operation of e-mailer controller 90 will be described in detail below. On line 1, e-mailer controller 90 will receive either a master ASCII text file of banking transactions for the creation of the mandated periodic statements or a master ASCII text file of bank notices or advices, at steps 100a and 100b, respectively.

If the master ASCII text file of banking transactions for the mandated periodic statements is received, at step 100a, thereafter, the master ASCII text file is archived on platters, at step 105, or on any other storage medium in a conventional manner. Once a determination is made that archiving has finished, at step 110, e-mailer controller 90 loads an e-mail recipient file, at step 115, stored in internal memory 99. In the preferred embodiment, the e-mail recipient file includes the customer bank account numbers of the e-mail recipients, the customer's name associated with each customer bank account number, the e-mail address for a customer, the electronic pictorial image presentation preferences, and the digital certificate of the customer's public, private key pair, including the expiration date. In the preferred embodiment, the digital certificate is maintained in confidence.

In the preferred embodiment, the digital certificate is obtained from a Certification Authority or the like. The banking institution can be a Certification Authority in addition to other certification authorities presently available. Each digital certificate has a certification life or expiration date. After the certification life has expired, the certificate is revoked. Nevertheless, the certificate can be revoked for other reasons or may be terminated by the customer if the customer's public, private key pair is compromised.

The hierarchy of the e-mail recipient file is by e-mail address. For a specific e-mail address, there may be more than one customer bank account number associated therewith. For each customer bank account number for an e-mail address there may be a different image presentation preference. However, in the preferred embodiment, for each e-mail address there is only one digital certificate associated therewith. Each ASCII text record in the master ASCII text file has associated therewith a customer bank account number of each recipient of the mandated periodic statement for the monthly anniversary. Thus, as the master ASCII text file is sent, e-mailer controller 90 reads the master ASCII text file and determines if there is a match between the embedded customer bank account number and a customer account number in the e-mail recipient file, at step 120. If there is no match, then the ASCII text record associated with the customer bank account number is placed in the second ASCII text file to be printed, at step 125.

In addition to determining whether the embedded customer bank account number is for an e-mail recipient, a determination is made whether the certification life has expired, at step 120. If the certification life has expired, then the ASCII text record associated of the embedded customer bank account number can no longer receive e-mailed mandated periodic statements until a new authenticated digital certificate is established. Therefore, the embedded customer bank account number and its associated ASCII text record is placed into the second ASCII text file to be printed, at step 125.

However, if a determination is made that the embedded customer bank account number of an ASCII text record is for an e-mail recipient, then the ASCII text record associated with the customer bank account number is placed in the first ASCII text file to be e-mail, at step 140.

In general, e-mailer controller 90 reads the entire master ASCII text file of banking transactions for the mandated periodic statements and purges therefrom all ASCII text records for those customer bank account numbers associated with the e-mail recipients.

The second ASCII text file to be printed is sent for printing, at step 130, in the manner described in detail above. The procedure for printing mandated periodic statements has been well established in the banking industry. Thus, no further description related to the printed is necessary. As can be readily seen, only those records from the master text file which are not associated with e-mail recipient accounts are printed. However, if the customer accounts for the banking institution are for only e-mail recipients than all records of the master text file are e-mailed except those having expired or revoked certificates.

After the e-mail recipient file is loaded, at step 140, internal memory 99 is evaluated for the predefined image presentation preferences, at step 145, for each e-mail recipient file by customer account number. Thereafter, e-mailer controller 90 creates a formatted mandated periodic statement shell 91a having inserted therein the ASCII text of banking transactions for a ASCII text record, at step 150, including customer-generated electronic transactions, bank-generated electronic transactions, hardcopy bank instrument (paper-based) transactions, etc. The formatted mandated periodic statement shell 91a further includes graphic links. Such graphic links define the location in the graphics database 67 for the retrieval of a specified graphic such as, without limitation, the banking institution's letterhead or logo 310. Moreover, formatted mandated periodic statement shell 91a may include marketing or advertisement blurbs to allow the banking institution to market new or updated services or the like. Such blurbs may include graphic links and/or text. Thus, in the preferred embodiment, the formatted mandated periodic statement shell 91a is dynamic so that such shell 91a may be changed or updated with marketing or advertisement blurbs.

In most instances, at least the front view of electronic pictorial images of cleared paper checks are requested for presentation in the e-mailed mandated periodic statements. Nevertheless, the front view and back view of electronic pictorial images of cleared paper checks may be requested for presentation. Additionally, some bank customers my prefer presentation of the front view, the back view or front and back views of cleared paper checks which exceed a defined dollar amount. Moreover, the customer may which to include pictorial images of various types of serial or non-serial numbered hardcopy bank instruments.

Bank advices and notices are not always the result of banking transactions from hardcopy bank instruments and thus may not have associated therewith image links. Thus, at set 155, a determination is made where electronic pictorial images of clear paper checks are needed. If the electronic pictorial images of clear paper checks are not needed, the formatted mandated periodic statement shell 91a with graphic links is assembled into the final mandated periodic statement whereby the graphic images are retrieved from graphic database 67 and inserted at the designated areas, at step 167.

Otherwise, based on the e-mail recipients pre-defined preferences for presentation of electronic pictorial images of hardcopy bank instruments (clear paper checks), the formatted mandated periodic statement shell 91a for a customer account number is appended with image links to such electronic pictorial images of clear paper checks stored in image database 61 of imaging system 60. In other words, the image links in the record are read and only those which define the electronic path to the pictorial images which meet the customer's preferences with be included.

In the exemplary embodiment, customer preferences include a front view of hardcopy bank instruments, a back view of hardcopy bank instruments, front and back views of hardcopy bank instruments, presentation of hardcopy bank instrument images having a dollar amount over a minimum value, etc. In addition to images of checks, customer preferences may further include the image presentation of non-serial numbered hardcopy bank instruments used to initiate a banking transaction such as a deposit slip, a withdrawal slip, etc.

After, the image links have been appended, the mandated periodic statement is assembled, at step 165. At step 165, the formatted mandated periodic statement shell 91a is expanded. The graphic images are retrieve via the graphic links and thereafter inserted into the formatted mandated periodic statement shell 91*a*. Additionally, the electronic pictorial images in accordance with the customer's pre-define preferences are retrieved from image database 61 and inserted into the formatted mandated periodic statement shell 91*a*. Once, all graphics and electronic pictorial images have been retrieved and inserted, a final mandated periodic statement has been assembled.

In the preferred embodiment, the formatted mandated periodic statement shell 91*a* is an HTML (hypertext markup language) formatted document and the graphic and image links are hypertext links. Moreover, graphic database 67 includes HTML (hypertext markup language) formatted graphics which may includes, in addition to the banking institutions letterhead or logo 310, marketing or advertisement blurbs.

After, assemblage of the mandated periodic statement has been completed, in step 165, the assembled mandated periodic statement is formatted according to a universally accepted page markup standard, at step 170. In the preferred embodiment, a page markup standard includes the Abode Acrobat standard or the like. The page markup standard should be readily available and interfaceable with various operating systems as is the Abode Acrobat standard. More importantly, the Abode Acrobat software is readily accessible and free via the Internet 95, other e-mail networks, or the like. Nevertheless, other page markup standards may be used.

After, the mandated periodic statement has been universally formatted, such as via the Abode Acrobat standard which creates a PDF document, at step 170, a standard simple mail transfer protocol (SMTP) is used to create a SMTP e-mail mandated periodic statement, at step 175, comprising in general a greeting message from the banking institution, an attached file containing the universally formatted mandated periodic statement, and a header having the e-mail address of the e-mail recipient. The e-mail address for the customer account is retrieved from internal memory 99.

After the SMTP e-mail mandated periodic statement has been created, in the preferred embodiment, the S/MIME standard is employed to digitally sign with the banking institutions digital signature and encrypt the SMTP e-mail mandated periodic statement, at step 180, in the manner described above with respect to the digital signing and encryption processes by electronic-mailer 96. Nevertheless, other standards compatible with and/or similar to S/MIME may be substituted. Thereafter, the digitally signed and encrypted SMTP e-mail mandated periodic statement is transmitted and delivered via Internet 95, other e-mail networks or the like to the e-mail recipient, at step 185.

Steps 145–185 are repeated for each and every ASCII text record in the first ASCII text file, created at step 140. Once all the digitally signed and encrypted SMTP e-mail mandated periodic statements have been e-mailed, e-mailer controller 90 finishes at step 190.

The steps 115–190 performed by the e-mailer controller 90 are iterated in the same manner, as described above, for the master ASCII text file of bank notices or advices. At step 130, the second ASCII text file created at step 125 is sent back to banking transaction host 20 via line 2.

As can be readily seen, the e-mailer controller 90 serves to adapt conventional banking system 15 for multi-mode delivery of banking notices or advices and mandated periodic statements.

It is noted that the embodiments of the bank system and e-mailer controller described herein in detail, for exemplary purposes, are of course subject to many different variations in structure, design, application and methodology. Because many varying and different embodiments may be made within the scope of the inventive concept(s) herein taught, and because many modifications may be made in the embodiments herein detailed in accordance with the descriptive requirements of the law, it is to be understood that the details herein are to be interpreted as illustrative and not in a limiting sense.

What is claimed is:

1. An e-mailer controller for use in a banking system comprising:

(a) an electronic formatted mandated periodic statement shell adapted to have inserted therein a text record of a plurality of banking transactions for a customer account;

(b) an image link appender capable of inserting at least one image link in said electronic formatted mandated periodic statement shell wherein said at least one image link defines an electronic path to at least one pictorial image of a hardcopy bank instrument identifying at least one bank transaction of said plurality of bank transactions;

(c) a document assembler adapted to assemble a mandated periodic statement from said electronic formatted mandated periodic statement shell and said at least one pictorial image;

(d) an electronic-mail creator which formats the assembled mandated periodic statement using a standardized electronic-mail transfer protocol into an electronic mandated periodic statement mail; and, (e) an electronic-mailer adapted to securely and privately electronically mail said electronic mandated periodic statement mail to an e-mail address for said customer account via a network.

2. The e-mailer controller of claim 1, wherein said at least one hardcopy bank instrument includes a serial numbered hardcopy bank instrument.

3. The e-mailer controller of claim 2, wherein said serial numbered hardcopy bank instruments includes checks.

4. The e-mailer controller of claim 3, wherein each check includes a front view pictorial image and a back view pictorial image.

5. The e-mailer controller of claim 2, wherein said at least one hardcopy bank instrument further includes a non-serial numbered hardcopy bank instrument.

6. The e-mailer controller of claim 5, wherein said non-serial numbered hardcopy bank instrument includes a deposit slip.

7. The e-mailer controller of claim 1, wherein said electronic-mailer includes:

(i) an electronic digital signature creator adapted to electronically sign said electronic mandated periodic statement mail with a banking institutions digital signature; and, (ii) an encryptor adapted to encrypt the digitally signed mandated periodic statement mail.

8. The e-mail controller of claim 1, wherein said network is the Internet.

9. The e-mailer controller of claim 1, wherein said formatted mandated periodic statement shell includes a graphic link wherein said graphic link identifies a electronic path to a banking institution's letterhead or logo.

10. The e-mailer controller of claim 9, wherein said electronic formatted mandated periodic statement shell is dynamic.

11. The e-mailer controller of claim 9, wherein said formatted mandated periodic statement shell is a HTML formatted document and said at least one image link and said graphic link are HTML links.

12. The e-mailer controller of claim 1, further comprising:
(f) a page-formatter which is adapted to format said assembled mandated periodic statement using a page markup standard.

13. The e-mailer controller of claim 12, wherein said page markup standard is an Abode Acrobat file standard.

14. The e-mailer controller of claim 1, wherein said standardized electronic-mail transfer protocol is a standard simple mail transfer protocol.

15. The e-mailer controller of claim 1, wherein said electronic-mailer mails said electronic mandated periodic statement mail using a S/MIME standard.

16. The e-mailer controller of claim 1, further comprising:
(f) a customer preference database defining at least one customer preference for presentation of said hardcopy bank instrument in said mandated periodic statement and
wherein said image link appender determines said at least one image link based on said at least one customer preference.

17. The e-mailer controller of claim 1, further comprising:
(f) a port coupled to said banking system to transfer therefrom a master text file of a plurality of text records wherein each record includes said plurality of banking transactions for said mandated periodic statement for a respective customer account;
(g) an e-mail recipient database identifying a plurality of customer accounts as e-mail recipients; and,
(h) a master file separator which separates from said master text file those records of said plurality of text records identified as being for said e-mail recipients into a first file and the remaining records of said plurality of text records are separated into a second file.

18. The e-mailer controller of claim 17, further comprising:
(i) a router adapted to route said second file back to said banking system.

19. The e-mailer controller of claim 1, further comprising:
(f) an electronic formatted bank document shell adapted to have inserted therein a text record of a bank notice or advice for a respective customer account;
wherein said document assembler is adapted to assemble a bank notice or advice statement from said electronic formatted bank document shell;
wherein said electronic-mail creator is adapted to format the assembled bank notice or advice statement using a standardized electronic-mail transfer protocol into an electronic bank notice or advice statement mail; and,
wherein said electronic-mailer is adapted to securely and privately electronically mail said electronic bank notice or advice statement mail to an e-mail address for said respective customer account via said network.

20. The e-mailer controller of claim 19, wherein said image link appender is adapted to insert at least one image link in said electronic formatted bank document shell wherein said at least one image link defines an electronic path to at least one pictorial image of a hardcopy bank instrument identified in said text record of said bank notice or advice.

21. An e-mailer controller for use in a banking system comprising:
(a) means for creating a formatted mandated periodic statement shell adapted to have inserted therein and text record of a plurality of banking transactions for a customer account;
(b) means for inserting at least one image link in said electronic formatted mandated periodic statement shell wherein said at least one image link defines an electronic path to at least one pictorial image of a hardcopy bank instrument identifying at least one bank transaction of said plurality of bank transactions;
(c) means for assembling a mandated periodic statement from said electronic formatted mandated periodic statement shell and said at least one pictorial image;
(d) means for formatting the assembled mandated periodic statement using a standardized electronic-mail transfer protocol into an electronic mandated periodic statement mail; and,
(e) means for securely and privately electronically transmitting said electronic mandated periodic statement mail to an e-mail address for said customer account via a network.

22. The e-mailer controller of claim 21, wherein said at least one hardcopy bank instrument includes a serial numbered hardcopy bank instrument.

23. The e-mailer controller of claim 22, wherein said serial numbered hardcopy bank instruments includes checks.

24. The e-mailer controller of claim 23, wherein each check includes a front view pictorial image and a back view pictorial image.

25. The e-mailer controller of claim 24, wherein said at least one hardcopy bank instrument further includes a non-serial numbered hardcopy bank instrument.

26. The e-mailer controller of claim 25, wherein said non-serial numbered hardcopy bank instrument includes a deposit slip.

27. The e-mailer controller of claim 21, wherein said transmitting means includes:
(i) means for digitally signing said electronic mandated periodic statement mail for said each account with a banking institutions digital signature; and,
(ii) means for encrypting the digitally signed mandated periodic statement mail.

28. The e-mailer controller of claim 21, wherein said network is the Internet.

29. The e-mailer controller of claim 21, wherein said formatted mandated periodic statement shell includes a graphic link wherein said graphic link identifies a electronic path to a banking institution's letterhead or logo.

30. The e-mailer controller of claim 29, wherein said formatted mandated periodic statement shell is dynamic.

31. The e-mailer controller of claim 29, wherein said formatted mandated periodic statement shell is a HTML formatted document and said at least one image link and said graphic link are HTML links.

32. The e-mailer controller of claim 21, further comprising:
(f) means for universally formatting said assembled mandated periodic statement using a page markup standard.

33. The e-mailer controller of claim 32, wherein said page markup standard is an Abode Acrobat file standard.

34. The e-mailer controller of claim 21, wherein said standardized mail transfer protocol is a standard simple mail transfer protocol.

35. The e-mailer controller of claim 21, wherein transmitting means mails said electronic mandated periodic statement mail using a S/MIME standard.

36. The e-mailer controller of claim 21, further comprising:
(f) a customer preference database defining at least one customer preference for presentation of said hardcopy bank instrument in said mandated periodic statement and
wherein said image link inserting means determines said at least one image link based on said at least one customer preference.-

37. The e-mailer controller of claim 21, further comprising:
- (f) means for receiving, from said banking system, a master text file of a plurality of text records wherein each record includes said plurality of banking transactions for said mandated periodic statement for a respective customer account;
- (g) an e-mail recipient database identifying a plurality of customer accounts as e-mail recipients; and,
- (h) means for separating from said master text file those records of said plurality of text records identified as being for said e-mail recipients into a first file and the remaining records of said plurality of text records are separated into a second file.

38. The e-mailer controller of claim 37, further comprising:
- (i) means for routing said second file back to said banking system.

39. The e-mailer controller of claim 21, further comprising:
- (f) means for creating a formatted bank document shell adapted to have inserted therein a text record of a bank notice or advice for a respective customer account;
- wherein said assembling means is adapted to assemble a bank notice or advice statement from said formatted bank document shell;
- wherein said formatting means is adapted to format the assembled bank notice or advice statement using a standardized electronic-mail transfer protocol into an electronic bank notice or advice statement mail; and,
- wherein said transmitting means is adapted to securely and privately electronically mail said electronic bank notice or advice statement mail to an e-mail address for said respective customer account via said network.

40. The e-mailer controller of claim 39, wherein said image link inserting means is adapted to insert at least one image link in said formatted bank document shell wherein said at least one image link defines an electronic path to at least one pictorial image of a hardcopy bank instrument identified in said text record of said bank notice or advice.

41. A method of electronically mailing a bank statement by a banking system comprising the steps of:
- (a) creating a formatted mandated periodic statement shell;
- (b) inserting in said formatted mandated periodic statement shell a text record of a plurality of banking transactions for a customer account;
- (c) inserting at least one image link in said formatted mandated periodic statement shell wherein said at least one image link defines an electronic path to at least one pictorial image of a hardcopy bank instrument identifying at least one bank transaction of said plurality of bank transactions;
- (d) assembling a mandated periodic statement from said formatted mandated periodic statement shell and said at least one pictorial image;
- (e) formatting the assembled mandated periodic statement using a standardized electronic-mail transfer protocol to create an electronic mandated periodic statement mail; and,
- (f) securely and privately electronically mailing said electronic mandated periodic statement mail to an e-mail address for said customer account via a network.

42. The method of claim 41, wherein said at least one hardcopy bank instrument includes a serial numbered hardcopy bank instrument.

43. The method of claim 42, wherein said serial numbered hardcopy bank instruments includes checks.

44. The method of claim 43, wherein each check includes a front view pictorial image and a back view pictorial image.

45. The method of claim 42, wherein said at least one hardcopy bank instrument further includes a non-serial numbered hardcopy bank instrument.

46. The method of claim 45, wherein said non-serial numbered hardcopy bank instrument includes a deposit slip.

47. The method of claim 41, wherein the mailing step of (f) comprises the steps of:
- (f1) digitally signing said mandated periodic statement mail with a banking institutions digital signature; and,
- (f2) encrypting the digitally signed mandated periodic statement mail.

48. The method of claim 41, wherein said network is the Internet.

49. The method of claim 41, wherein said formatted mandated periodic statement shell includes a graphic link wherein said graphic link identifies a electronic path to a banking institution's letterhead or logo.

50. The method of claim 49, wherein said formatted mandated periodic statement shell is dynamic.

51. The method of claim 49, wherein said formatted mandated periodic statement shell is a HTML formatted document and said at least one image link and said graphic link are HTML links.

52. The method of claim 49, wherein the assembling step (d) comprises:
- (d1) retrieving said at least one pictorial image via said at least one image link; and,
- (d2) retrieving said letterhead or said logo via said graphic link.

53. The method of claim 41, further comprising the step of:
- (g) universally formatting the assembled mandated periodic statement with a page markup standard.

54. The method of claim 53, wherein said page markup standard is an Abode Acrobat file standard.

55. The method of claim 41, wherein the mailing step of (f) comprises the steps of:
- (f1) privatizing said mandated periodic statement mail using a S/MIME standard.

56. The method of claim 41, the inserting step (c) comprises the steps of:
- (c1) determining said at least one said image link based on at least one customer preference.

57. The method of claim 56, wherein said at least one customer preference includes presentation of at least one of (1) a front view of checks or other hardcopy bank instruments; (2) front and back views of said hardcopy bank instrument; and, (3) checks over a predefined dollar amount.

58. The method of claim 41, further comprises prior to step (a) the steps of:
- (g) receiving, from said banking system, a master text file of a plurality of text records wherein each record includes said plurality of banking transactions for said mandated periodic statement for a respective customer account;
- (h) identifying whether a respective one of said text records is for an e-mail recipient;
- (i) separating from said master text file each said respective one of said text records identified as being for said e-mail recipient into a first file;
- (j) separating from said master text file each said respective one of said text records having not been identified in step (h) into a second file; and,
- (k) repeating steps (g)–(j) for all of said text records.

59. The method of claim 58, further comprising the step of:
- (l) routing said second file back to said banking system.

60. The method of claim 58, wherein the step of (h) further comprises the step of:

(h1) determining if a customer's digital certificate has expired; and, (h2) if said customer's digital certificate has expired said text record for said e-mail recipient is separated into said second file.

61. The method of claim 41, further comprising:
(g) creating a formatted bank document shell adapted to have inserted therein a text record of a bank notice or advice for a respective customer account;
(h) assembling a bank notice or advice statement from said formatted bank document shell;
(i) formatting the assembled bank notice or advice statement using a standardized electronic-mail transfer protocol into an electronic bank notice or advice statement mail; and,
(j) securely and privately electronically mailing said electronic bank notice or advice statement mail to an e-mail address for a respective customer account via a network.

62. The method of claim 61, further comprising after the step (g) the step of:
(k) inserting at least one image link in said formatted bank document shell wherein said at least one image link defines an electronic path to at least one pictorial image of a hardcopy bank instrument identified in said text record of said bank notice or advice.

63. An electronic-mail banking system comprising:
(a) means for creating a plurality of images of a plurality of hardcopy bank instruments for each account of a plurality of accounts;
(b) means for cyclically generating a mandated periodic statement identifying a plurality of bank accounting transactions for a predetermined cyclical time period for said each account;
(c) means for linking those images of said plurality of images to said mandated periodic statement identifying at least part of said plurality of bank accounting transactions for said predetermined cyclical time;
(d) means for assembling said mandated periodic statement and said those images of said plurality of images to create an assembled mandated periodic statement mail for said each account; and,
(e) means for privately and securely e-mailing the assembled mandated periodic statement mail for said each account.

64. An electronic-mail banking system comprising:
(a) means for creating a plurality of images of a plurality of hardcopy bank instruments wherein each hardcopy bank instrument identifies a bank accounting transaction of a predetermined account of a plurality of accounts;
(b) means for logging said bank accounting transaction of said each hardcopy bank instrument of said predetermined account of said plurality of accounts in a central repository;
(c) means for cyclically generating a mandated periodic statement identifying said bank accounting transaction for said each hardcopy bank statement for a predetermined cyclical time period of said predetermined account for said plurality of accounts;
(d) means for linking an image of said each hardcopy bank instrument identifying said bank accounting transaction for said predetermined cyclical time period to said mandated periodic statement for said predetermined account of said plurality of accounts via a data path;
(e) means for retrieving via said data path the linked image of said each hardcopy bank instrument for said each predetermined account;
(f) means for assembling said mandated periodic statement and the retrieved linked image of said each hardcopy bank instrument to create an assembled mandated periodic statement mail for said each predetermined account; and,
(g) means for privately and securely e-mailing said assembled mandated periodic statement mail for said each predetermined account.

65. A multi-mode banking system comprising:
(a) means for creating a plurality of images of a plurality of hardcopy bank instruments for each account of a plurality of accounts;
(b) means for cyclically generating a mandated periodic text statement of a plurality of bank accounting transactions of a predetermined cyclical time period for said each account of said plurality of accounts;
(c) means for determining those accounts of said plurality of accounts are e-mail recipients;
(d) means for assembling said mandated periodic text statement and those images of said plurality of images identifying said plurality of bank accounting transactions of said predetermined cyclical time period to create an assembled mandated periodic text statement for said each account of said plurality of accounts;
(e) means for securely and privately e-mailing said assembled mandated periodic text statement for said those accounts of said e-mail recipients; and,
(f) means for printing said assembled mandated periodic text statement for any remaining accounts.

66. The system of claim 65, wherein said plurality of hardcopy bank instruments includes serial numbered hardcopy bank instruments.

67. The system of claim 66, wherein said serial numbered hardcopy bank instruments includes checks.

68. The system of claim 67, wherein said plurality of images includes backs and fronts of said checks.

69. The system of claim 66, wherein said plurality of hardcopy bank instruments further includes non-serial numbered hardcopy bank instruments.

70. The system of claim 69, wherein said non-serial numbered hardcopy bank instruments includes deposit slips.

71. The system of claim 67, further comprising:
(g) means for determining a non sufficient fund status for clearing any of said checks for any of said plurality of said accounts;
(h) means for creating an image of a NSF check; and,
(i) means for creating a NSF statement indicating said non sufficient fund status wherein said e-mailing means is adapted to electronically mail said NSF statement with said image of said NSF check.

72. The system of claim 65, wherein said e-mailing means includes:
(i) means for digitally signing said assembled mandated periodic text statement mail; and,
(ii) means for encrypting the digitally signed mandated periodic text statement mail.

73. The system of claim 72, wherein said signing and said encrypting is in accordance with the S/MIME protocol.

74. The system of claim 65, further comprising;
(g) means for logging a bank accounting transaction of said each hardcopy bank instrument to said predetermined account of said plurality of accounts in a central repository.

* * * * *